Aug. 30, 1949.                    H. D. HUME                    2,480,294
                    MOUNTING DEVICE FOR DRAPER ROLLERS
                         Filed Nov. 6, 1947
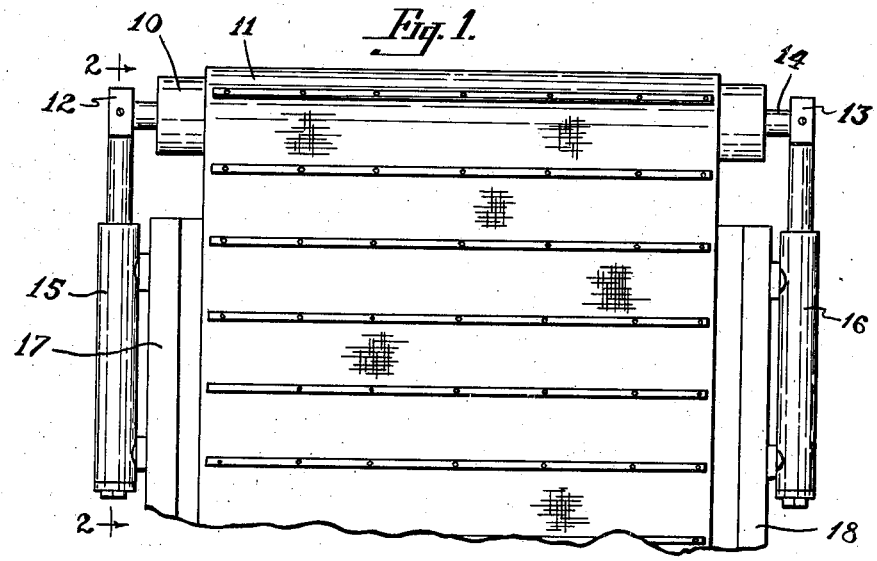
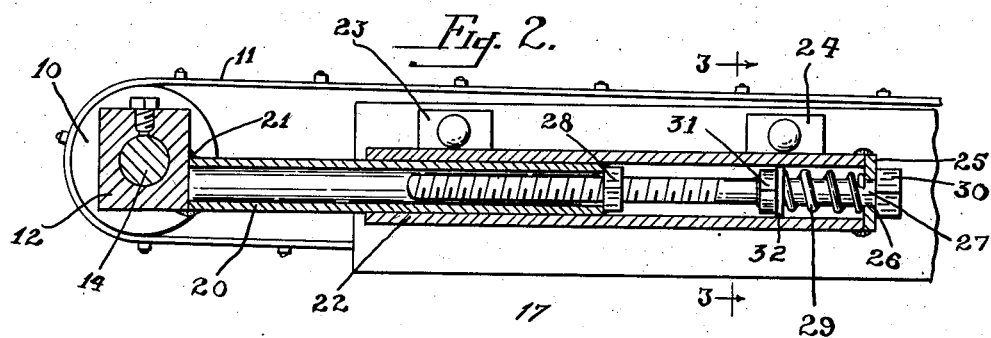
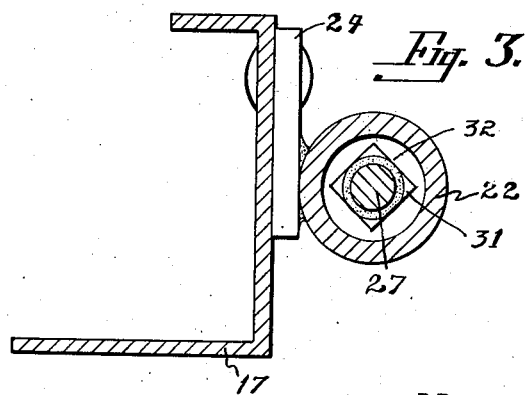
Inventor
Horace D. Hume
By
Smith & Wells
Attorney Patented Aug. 30, 1949

2,480,294

UNITED STATES PATENT OFFICE 2,480,294

MOUNTING DEVICE FOR DRAPER ROLLERS

Horace D. Hume, Mendota, Ill.

Application November 6, 1947, Serial No. 784,353

3 Claims. (Cl. 198—208)

My invention relates to improvements in mounting device for draper rollers.

In harvesting machinery it is customary to use conveyors for conveying the cut crop from the sickle to a point of disposal. In some instances the conveyor travels parallel to the movement of sickle and in other instances it travels away from the sickle. The conveyors are often used on inclined frames to elevate the crop as in feeding it to a combine harvester or elevating it for the purpose of loading it on a conveyance for hauling it to a destination. It is customary in referring to these conveyors, particularly those which are used in connection with the cutting device, as drapers. They are commonly made of canvas although, of course, any suitable material may be used. In mounting these devices in the frames of the machine rollers are used and the drapers are in the form of endless belts. One of the rollers is power driven. The other roller may also be power driven, but usually is not. Since this equipment must be used in various atmospheric conditions where it gets wet and dries out frequently, the matter of maintaining the proper tension on the endless belt is difficult. It is the purpose of my invention to provide a novel mounting device for use in mounting the rollers for drapers on the frame that carries the draper, which device will serve to maintain adequate tension on the endless belt by moving the roller in response to shrinking or expanding of the belt.

It is a further and more specific object of my invention to provide a device of this character which is simple and inexpensive and which may readily be applied to the harvesting machinery where it may serve its purpose without in any way interfering with the standard existing parts of the machinery.

My invention contemplates a mounting device for each end of the draper roller which embodies a pair of telescoping pipe sections, one of which is suitably welded to a bearing block for the draper roller and the other of which is bolted or riveted to the frame that mounts the draper. These parts are combined with a simple adjusting screw and spring combination so that the endless belt or draper may be tightened to the proper tension and will then be maintained reasonably close to this tension in operation by virtue of the resilience of the mounting device as assembled.

The novel features that I consider characteristic of my invention are set forth with particularity in the claims. The invention, itself, however, both as to its organization and its method of operation, together with additional objects and advtanges thereof, will be understood from the description of a specific embodiment when read in connection with the accompanying drawings, in which:

Figure 1 is a plan view showing one end of a draper and its mounting frame with my invention applied thereto;

Figure 2 is an enlarged sectional view taken on the line 2—2 of Figure 1; and

Figure 3 is a further enlarged sectional view taken on the line 3—3 of Figure 2.

Referring now to the drawings my invention is shown in Figure 1 as applied to the mounting of a roller 10 over which an endless belt or draper 11 passes. Bearing blocks 12 and 13 mount the shaft 14 of the roller 10. My improved mounting devices are shown at 15 and 16. These devices are secured to the side frames 17 and 18 of the supporting framework for the draper 11.

Figure 2 of the drawings illustrates the mounting device 15 in longitudinal section. A pipe 20 is welded to the bearing block 12 as indicated at 21 and telescopes with another pipe 22. The pipe 22 has two mounting brackets 23 and 24 welded thereto and these brackets are secured to the side frame 17. A plate 25 is welded on the right-hand end of the pipe 22 and has an aperture 26 through which a bolt 27 extends. The bolt 27 is threaded into a nut 28 that is welded to the nut 31 and the cap plate 25. The bolt has a nut 31 welded thereon at a short distance from the right-hand end of the bolt. A spring 29 and a washer 32 are mounted on the bolt between the nut 31 and the cap plates 25. The bolt has a head 30 thereon by which it may be rotated.

The operation of this device is believed to be readily apparent from the foregoing description and the drawings. When it is desired to apply the proper tension to the draper belt 11 the bolt 27 is turned by means of the head 30 to move the pipe 20 outwardly or to the left as shown in Figure 2. When the proper adjustment has been made the springs 29 in the two devices 15 and 16 will be under substantially equal compression so as to hold the roller 10 extended the proper distance to give the requisite tension on the belt. If the belt stretches slightly the springs 29 will take up the slack by moving the pipe 20 farther to the left. This automatic adjustment will continue to take place so long as the bolts 27 are turned far enough to leave some space between the head 30 and the plate 25. By checking the position of the head 30 the user of the equipment can always tell whether the roller is being held under tension by the springs 29.

It is believed that the nature and advantages of my invention will be clear from the foregoing description. Having thus described my invention I claim:

1. A mounting device for the rollers of a conveyor such as a draper, comprising a bearing block adapted to mount a roller shaft, a pipe fixed to the bearing block, a second pipe in which the first pipe is telescoped, mounting means on the second pipe for mounting the device on a conveyor support, an internally threaded member on the first pipe and within the second pipe, a bolt threaded in said member and extending beyond the first pipe through the second pipe, said second pipe having a closure plate through which the bolt extends, a spring coiled about said bolt within the second pipe and a stop member fixed on said bolt between the threaded member and the spring.

2. A mounting device for the rollers of a draper in harvesting machinery comprising a member adapted to rotatably support a roller shaft, a pipe fixed thereto, a second pipe in which the first pipe is slidably supported, brackets on the second pipe for mounting it on a draper frame, a bolt threaded into the end of the first pipe remote from the member, a stop member on said bolt within the second pipe, a second stop member on the second pipe through which said bolt extends, and spring means between said stop members urging them apart.

3. A mounting device for the rollers of a draper in harvesting machinery comprising a member adapted to rotatably support a roller shaft, a pipe fixed thereto, a second pipe in which the first pipe is slidably supported, brackets on the second pipe for mounting it on a draper frame, a nut on the end of the inner pipe, a bolt having a long threaded portion extending through the nut into the first pipe, said bolt having a stop nut welded thereon between the threaded portion and the head of the bolt, a plate closing the end of the second pipe, said bolt extending through the plate, and a coiled spring interposed between the plate and stop nut.

HORACE D. HUME.

No references cited.